June 28, 1966 K. M. ALLEN ETAL 3,258,112
SPIRAL DOWN FEED CONVEYOR
Filed Feb. 2, 1965 3 Sheets-Sheet 1
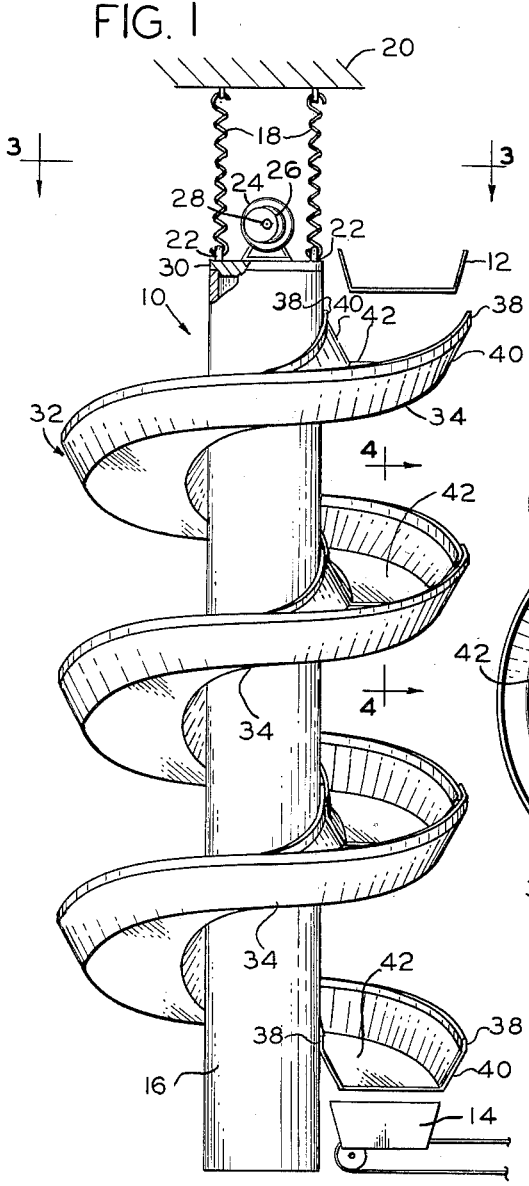
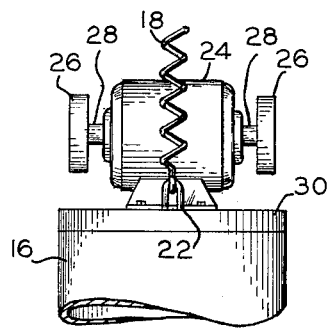
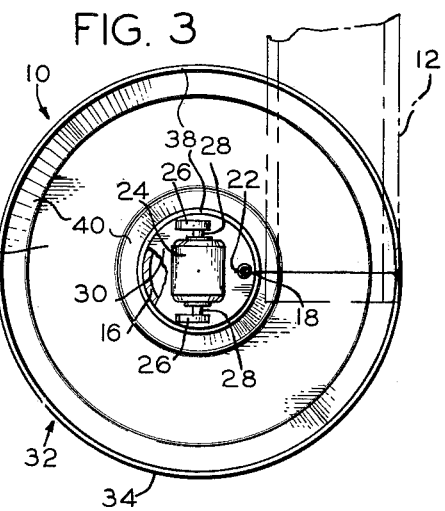
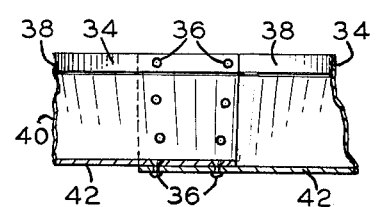
INVENTORS
KENNETH M. ALLEN
CHESTER H. HARPER
BY
BUCKHORN, BLORE, KLARQUIST & SPARKMAN
ATTORNEYS June 28, 1966  K. M. ALLEN ETAL  3,258,112
SPIRAL DOWN FEED CONVEYOR Filed Feb. 2, 1965  3 Sheets-Sheet 2

INVENTORS
KENNETH M. ALLEN
CHESTER H. HARPER
BY
BUCKHORN, BLORE, KLARQUIST & SPARKMAN

ATTORNEYS

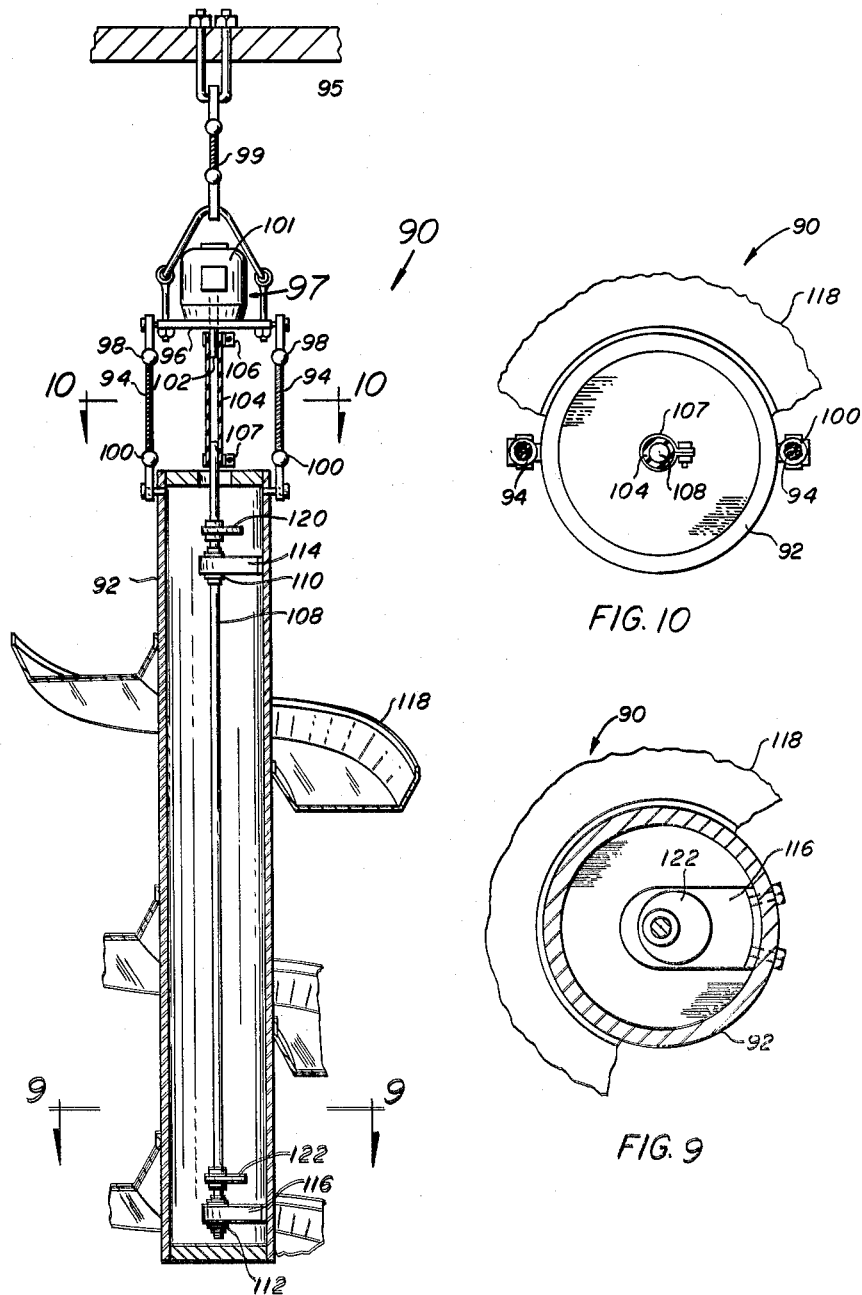

United States Patent Office 3,258,112
Patented June 28, 1966

3,258,112
SPIRAL DOWN FEED CONVEYOR
Kenneth M. Allen and Chester H. Harper, Newberg, Oreg., assignors to Allen-Harper, Inc., Newberg, Oreg., a corporation of Oregon
Filed Feb. 2, 1965, Ser. No. 431,769
8 Claims. (Cl. 198—220)

This application is a continuation-in-part of our copending application Ser. No. 273,672, filed Apr. 17, 1963, for Spiral Down Feed Conveyor, now abandoned.

This invention relates to spiral down feed conveyors, and more particularly to vibratory spiral down feed conveyors.

In the handling of relatively fragile material such as, for example, potato chips, during processing thereof, it sometimes becomes necessary to lower the materials greater distances than the materials can be dropped without damage thereto. Down feed conveyors for such materials have been provided in the past, but when such conveyors have been effective to lower the materials without breakage thereto, they have been complex and bulky. It would be desirable to have a down feed conveyor which is simple and inexpensive and which occupies a minimum of space while very gently lowering the materials.

Accordingly, it is an object of the invention to provide a simple, effective down feed conveyor which lowers fragile materials without damage thereto.

A further object of the invention is to provide spiral conveyors adapted to hold material thereon without feed therealong when not vibrated and to feed the materials gently downwardly therealong when vibrated.

Another object of the invention is to provide spiral down feed conveyors having a minimum number of components.

A still further object of the invention is to provide a spiral downfeed having a floating spiral conveyor trough and means for vibrating the trough supported independently of the trough.

The invention provides a spiral down feed conveyor including a central tube supported resiliently in a vertical position and supporting a spiral trough extending therearound. In one embodiment of the invention, an electric motor is mounted on the top of the tube and carries an eccentric weight to vibrate the tube and trough to cause material on the trough to flow gently downwardly along the trough. In another embodiment of the invention, an electric motor is mounted in the tube and drives a shaft journaled in and extending along the tube and having an eccentric weight mounted on the shaft. In a further embodiment of the invention, a vertically extending spiral trough is floatingly mounted and eccentric weights coupled to the trough are driven by a flexible coupling which is rotated by an electric motor mounted independently of the trough.

A complete understanding of the invention may be obtained from the following detailed description of spiral down feed conveyors forming specific embodiments thereof, when read in conjunction with the appended drawings, in which:

FIG. 1 is a front elevation view of a spiral down feed conveyor forming one embodiment of the invention;

FIG. 2 is an enlarged, fragmentary, side elevation view of the conveyor of FIG. 1;

FIG. 3 is a horizontal sectional view of the conveyor of FIG. 1, taken along line 3—3 of FIG. 1;

FIG. 4 is an enlarged vertical sectional view taken along line 4—4 of FIG. 1;

Figure 5:
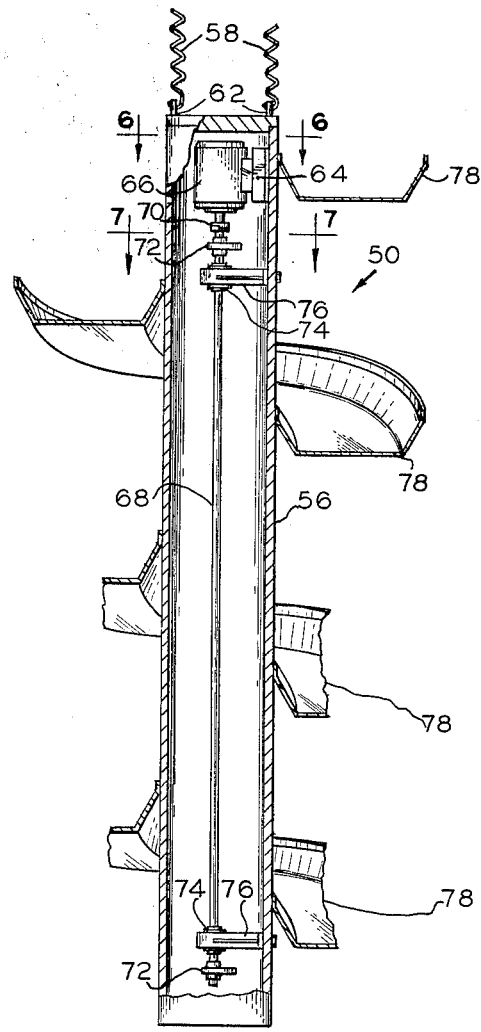
FIG. 5 is a fragmentary, vertical, sectional view of a spiral down feed conveyor forming an alternate embodiment of the invention.

FIG. 8 is a vertical sectional view of a spiral down feed conveyor forming an alternate embodiment of the invention; and FIGS. 9 and 10 are horizontal sectional views taken respectively along lines 9—9 and 10—10 of FIG. 8.

Referring now in detail to FIGS. 1 to 4 of the drawings, a spiral conveyor 10 forming one embodiment of the invention is adapted to receive material from the discharge end of a conveyor 12 and lower the material and drop it into a receiving device 14, which may be a batch weigher and conveyor, or any other suitable device for receiving material. The conveyor 10 is adapted to feed the material gently downwardly therealong when the conveyor 10 is vibrated but to not feed the material and to hold it thereon when the conveyor 10 is not vibrated. Thus, the conveyor 10 may be used to feed the material as desired. The conveyor 10 includes a tubular housing 16 supported resiliently by springs 18 secured to a ceiling or roof beam 20 at their uper ends and to eyes 22 at their lower ends, the eyes 22 being fixed rigidly to the housing 16. The springs 18 suspend the housing 16 in a substantially vertical position, and constitute the sole support for the housing 16. The housing 16 may be composed of aluminum or other suitable metal.

An electric motor 24 may be energized as desired to rotate eccentric weights 26, which are keyed to a shaft 28 of the motor with the eccentricity thereof in phase with each other. That is, each of the weights is eccentric in the same radial direction from the shaft 28. When the motor 24 is driven, the eccentric weights 26 are rotated to impart vibration to the conveyor 10. A cap 30 forms the top of the tubular housing 16 and supports the motor 24 rigidly thereon.

A spiral trough 32 is composed of segments 34, which are spliced together at the adjacent ends thereof to form the continuous trough. Each segment 34 extends slightly over 360°, and overlaps the segments extending from the ends thereof. The segments 34 are spliced together as illustrated in FIG. 4, in which the lower end of each upper segment 34 overlaps the upper end of the segment 34 immediately therebelow, and the segments are secured together by rivets 36. Each segment 34 may be constructed by spinning an annular pan-like member with vertical flanges 38, sloping sides 40, and flat bottoms 42. After the annular pans are formed, each pan is severed radially at one point therealong and the resulting ends are displaced vertically from each other to form the pan into the spiral segment 34. The segments then are spliced together and are positioned on the tubular housing 16 and are tensioned slightly to place the inner flanges 38 into close engagement with the housing 16, after which the inner flnages 38 are welded, brazed or otherwise suitably secured to the housing 16.

In the operation of the conveyor 10, the conveyor 12 feeds material into the upper end of the trough 32, and the motor 24 is energized to vibrate the conveyor 10. Since the weights 26 are rotated on a generally horizontal axis, the vibration imparted to the conveyor is generally in a vertical plane, and may be considered to be non-advancing vibration or shaking as contrasted with circular translational motion about the longitudinal axis of the conveyor and wobbling motion in phase therewith such as to cause the material to move upwardly along the trough 32, spiral conveyors having such circular translational motion and wobbling movement being disclosed and claimed in our copending application Ser. No. 277,-974, filed Apr. 17, 1963, now Patent No. 3,217,864. That is, the vibration from the weights 26 is such as to impart no resultant component to the conveyor trough 32 which would tend to advance the material upwardly along the trough, but merely shakes the material loose from the trough so that material slides freely down the trough. Such vibration which merely breaks the friction between the material and the trough will be termed "non-advancing vibration," "non-feeding vibration" or "shaking" throughout the specification and claims herein. The springs 18 permit free vibrating movement of the trough 32. The vibration causes the material to flow rapidly along the trough downwardly and to discharge into the receiving device 14. When it is desired to stop feed of the material to the receiving device 14 the motor 24 is de-energized and the material in the trough 32 rests without down feed. When feed is to be resumed the motor 24 is again energized and the conveyor 10 feeds the material gently but rapidly along the trough 32.

Figure 6:
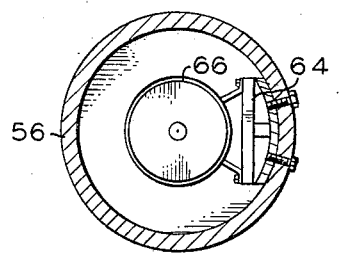
FIG. 6 is an enlarged, horizontal sectional view taken along line 6—6 of FIG. 5.
Figure 7:
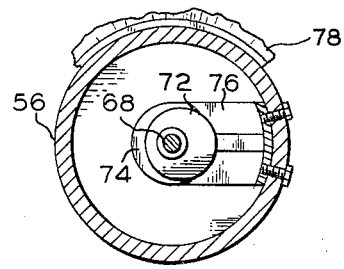
FIG. 7 is an enlarged, horizontal sectional view taken along line 7—7 of FIG. 5.

A vibratory spiral down feed conveyor 50 (FIGS. 5, 6 and 7) forming an alternate embodiment of the invention is generally similar to the spiral conveyor 10, but has a different vibrating device from that of the conveyor 10. The conveyor 50 includes a tubular housing 56 suspended in a vertical position by springs 58 connected at their lower ends to eyes 62 fixed to the housing 56. A mount 64 mounts an electric motor 66 in the inside of the tubular housing 56. The motor drives a shaft 68 through a flexible coupling 70 and the shaft 68 rotates eccentric weights 72 keyed thereto to vibrate the conveyor 50. The shaft 68 is mounted coaxially in the housing 56 by means of bearings 74 supported by rigid brackets 76 secured rigidly to the inner wall of the tubular housing 56. A spiral conveyor trough 78 similar to the trough 32 is fixed rigidly to the periphery of the tubular housing 56 similarly to the attachment of the trough 32 to the housing 16. The weights 72 are mounted in axial alignment with each other so that their eccentricities are in phase with each other. Suitable cooling vents (not shown) may be provided in the housing 56.

In the operation of the vibratory spiral down feed conveyor 50, material is fed to the upper end of the trough 78 and the motor 66 is energized while the material is to be fed downwardly along the trough 78. The motor 66 rotates the shaft 68, which in turn rotates the eccentric weights 72 and the latter vibrate the housing 56 and the trough 78 to cause the material on the trough 78 to feed downwardly therealong. The weights 72 impart circular translatory motion to the trough 78 about the longitudinal axis of the spiral conveyor 50, preferably in a direction opposite to that in which the material flows around the longitudinal axis of the conveyor. However, there is no wobbling or tilting of the conveyor of such a phase and magnitude as to cause any tendency to feed the material upwardly along the trough or to retard downward flow of the material along the trough. The pitch of the spiral trough 78 is such that when the motor 66 is running, the material being fed will feed rapidly but gently along the trough, and when the motor 66 is de-energized, the material will not move along the trough 78. In one constructed conveyor forming a successful embodiment of the invention, the pitch or inclination of the trough was about 14°.

A vibratory spiral down feed conveyor 90 (FIGS. 8, 9 and 10) forming an alternate embodiment of the invention includes a tubular housing 92 suspended floatingly in a vertical position by a pair of flexible cables 94 from a motor mount 96 of a motor 97. The motor includes a stator or frame 101 and a rotor including a shaft 102. The cables are connected by pivotal connectors 98 and 100 to the mount and the housing. The cables permit free vibrating of the housing. The motor mount 96 is suspended from a fixed support 95 by a cable 99. The electric motor 97 rotates a flexible shaft 104, which in the disclosed embodiment is a rubber hose, drivingly connected by clamps 106 and 107 to the shaft of the motor and to a rotor shaft 108 journaled in radial-and-thrust bearings 110 and 112 supported by brackets 114 and 116 carried rigidly by the housing at opposite ends thereof. The shaft 109 is centered in the tubular housing 92, and the cables 94 are equidistant from the shaft 104 on directly opposite sides thereof. A spiral conveyor trough 118 similar to the trough 32 is fixed rigidly to the outer periphery of the tubular housing 92. The inclination of the trough is preferably about 14°. A pair of eccentric weights 120 and 122 are keyed to the shaft 108 in axial alignment with each other so that their eccentricities are in phase with each other.

In the operation of the conveyor 90, material to be carried by the conveyor is fed to the upper end of the trough 118, and the motor 97 is energized. The motor rotates the shaft 108 and eccentric weights 120 and 122. The eccentric weights vibrate the housing 92 and the trough 118 to impart a circular, horizontal, translatory motion to the trough. This causes the material to flow smoothly down the trough. The flexibility of the cables 94 and the shaft 104 permit free circular translatory motion of the housing 92 and the trough 118 with minimum damping effect on such motion. Also, since the weight of the motor 97 is fully supported by the support 96 independently of the housing and the trough, the motor has no damping effect on the circular translatory motion of the housing and the trough. Preferably the weights 120 and 122 impart the circular translatory motion to the trough in a direction opposite to that of the flow of the material around the axis, and there is no wobbling or tilting of the trough of such a phase and magnitude as to cause any tendency to feed the material upwardly along the trough or to retard downward flow of the material. The material is fed rapidly but gently downwardly along the trough while the motor is energized, and when the motor is de-energized, the material will not move along the trough.

The above-described conveyors 10, 50 and 90 effectively feed materials downwardly therealong without damage to the materials. The feeds of the material also may be instantaneously interrupted by stopping the vibration of the conveyors. The construction of the conveyors is very rugged and durable, while being simple and inexpensive. Each of the conveyors occupies a minimum of space while feeding the materials downwardly from substantial heights. The conveyors may be easily installed and easily moved from one location to another.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a down feed conveyor,
spiral conveyor trough means,
means supporting the trough in a vertically extending position and permitting translatory orbital movement of the trough about the central axis thereof,
eccentric rotor means,
means mounting the rotor means on the trough means rotatably on said central axis,
an electric motor,
means supporting the electric motor independently of the trough means and the rotor,
and flexible shaft means coupling the motor to the rotor.

2. In a down feed conveyor,
a support,
an electric motor having a stator fixed to the support and carried thereby in a vertical position,
a spiral conveyor trough means,
eccentric rotor means carried by the trough means for rotation relative thereto on the central axis of the trough, flexible support means suspending the trough means from the support in a vertically extending position substantially aligned with the motor,
and a flexible shaft drivingly connecting the motor to the eccentric rotor means, whereby the motor rotates the rotor on said axis to impart circular translatory motion to the trough means.

3. The down feed conveyor of claim 2 wherein the flexible shaft comprises an elastic hose.

4. The down feed conveyor of claim 2 wherein the flexible support means includes a pair of flexible cables suspending the trough from the support.

5. In a down feed conveyor,
a tube,
means for resiliently mounting said tube in a vertically extending position,
a spiral conveyor trough rigidly supported by and extending around the tube,
a single vibration generator means carried in said tube, said generator means comprising a shaft extending vertically and centrally within said tube,
eccentric weight means carried on said shaft,
and means for rotating said shaft about its axis,
whereby continuous unidirectional rotation of said shaft and weight means imparts to said tube and to said trough a continuous unidirectional orbital vibration primarily in a plane transverse to the axis of said tube.

6. A down feed conveyor according to claim 5 wherein said means for rotating said shaft is mounted within said tube.

7. A down feed conveyor according to claim 5 wherein said means for rotating said shaft is mounted independently of said tube and drivingly connected to said shaft by a flexible coupling means.

8. A down feed conveyor according to claim 5 wherein said means for rotating said shaft rotates said shaft in a direction opposite to the downwardly spiraling direction of said trough means.

References Cited by the Examiner

UNITED STATES PATENTS

| 1,775,888 | 9/1930 | Christian | 198—213 |
| 3,053,379 | 9/1962 | Roder. | |

FOREIGN PATENTS

| 567,426 | 12/1958 | Canada. |
| 811,273 | 4/1956 | Great Britain. |
| 838,072 | 6/1960 | Great Britain. |
| 563,935 | 7/1957 | Italy. |

EVON C. BLUNK, *Primary Examiner.*

RICHARD E. AEGERTER, SAMUEL F. COLEMAN,
*Examiners.*